Nov. 29, 1949 K. C. CLARK 2,489,561
TIRE-WHEEL OR TIRE-RIM ASSEMBLY CARRIER
Filed Nov. 26, 1946 2 Sheets-Sheet 1
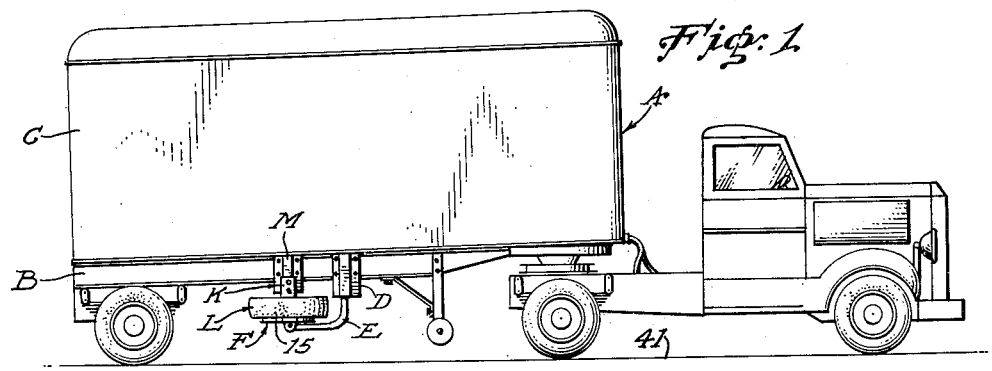
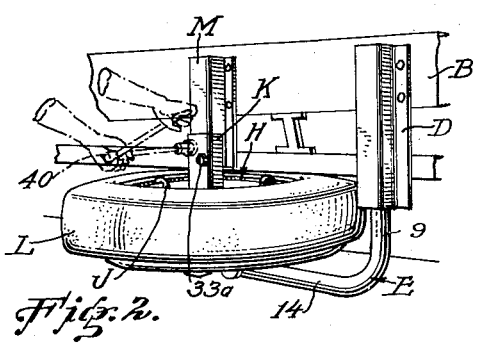
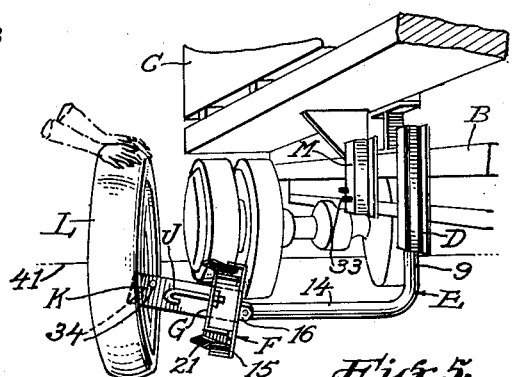
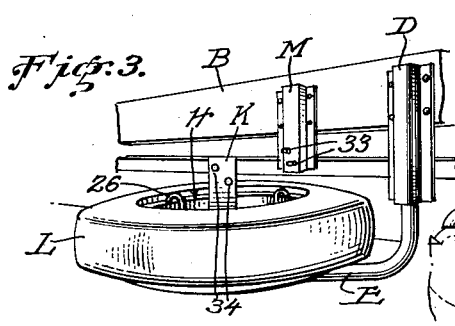
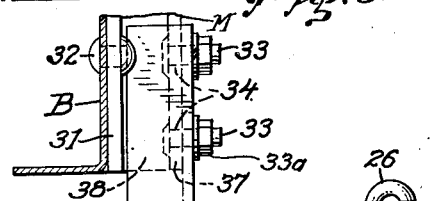
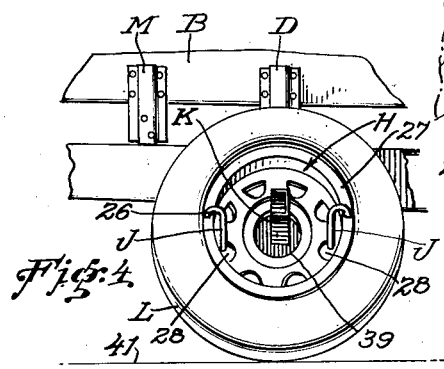
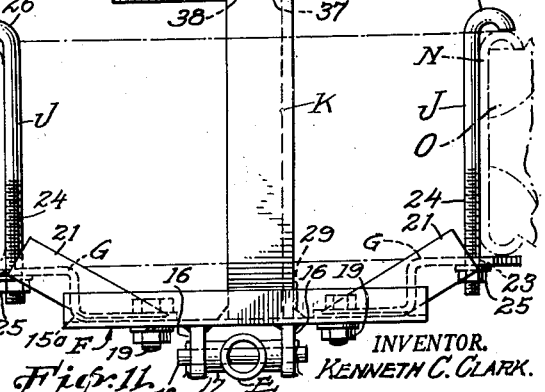
INVENTOR.
KENNETH C. CLARK.
BY
ATTORNEYS.

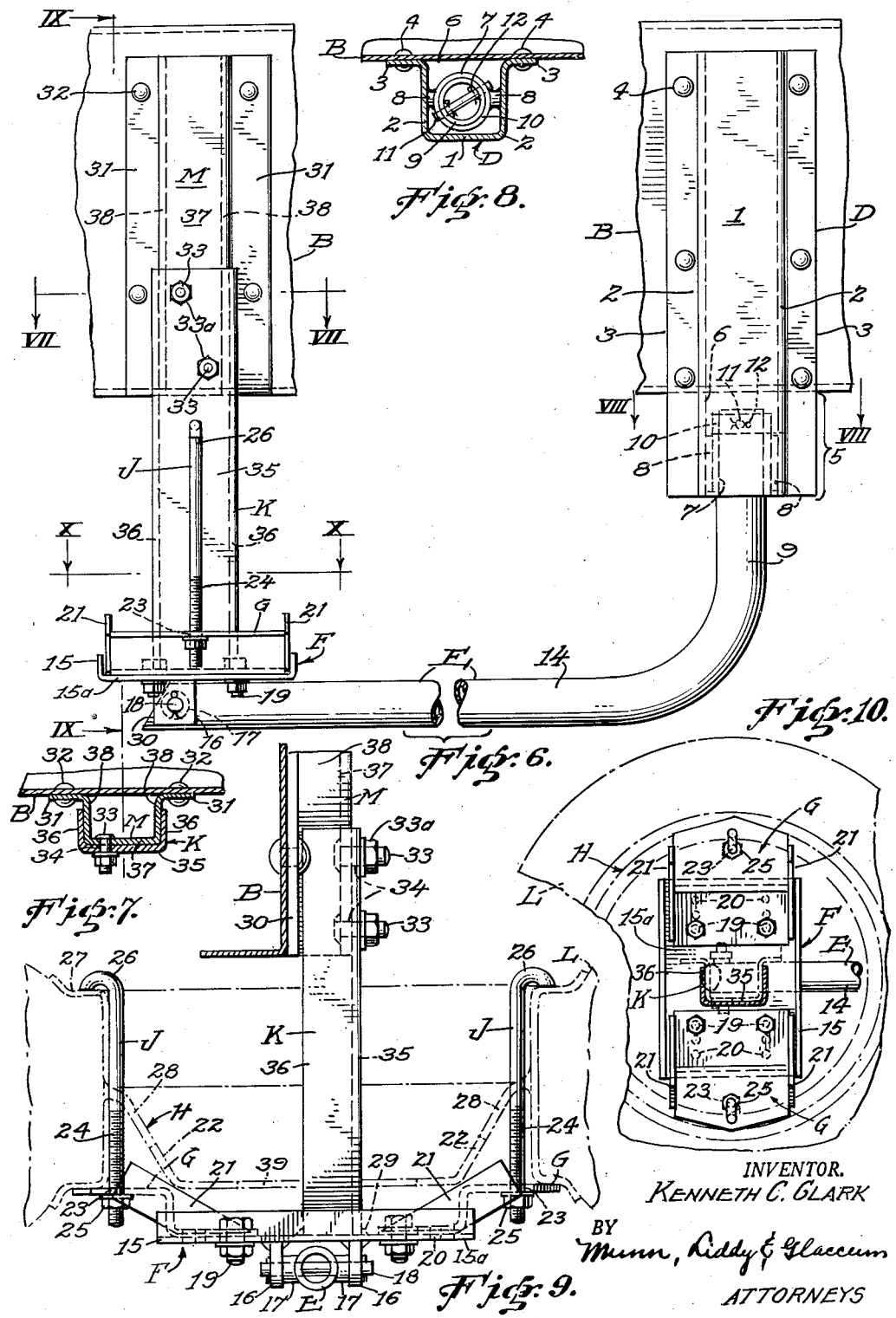

Patented Nov. 29, 1949

2,489,561

UNITED STATES PATENT OFFICE 2,489,561

TIRE-WHEEL OR TIRE-RIM ASSEMBLY CARRIER

Kenneth C. Clark, Watsonville, Calif.

Application November 26, 1946, Serial No. 712,451

11 Claims. (Cl. 224—42.22)

The present invention relates to improvements in a tire-wheel or tire-rim assembly carrier. It consists of the combinations, constructions and arrangement of parts hereinafter described and claimed.

An object of my invention is to provide a tire-wheel or tire-rim assembly carrier, which is an improvement over the Auxiliary wheel and tire carrier, covered in my United States Letters Patent No. 2,399,207, granted April 30, 1946, and also my "Simplified auxiliary wheel and tire carrier," Patent No. 2,378,911, issued June 26, 1945.

Both of these patents relate to a wheel and tire carrier, in which a swingable arm is mounted on the chassis frame of a vehicle for movement in a horizontal plane. This arm has a platform hinged thereto on which an auxiliary wheel and tire are supported. The platform is close enough to the ground so that the tire will rest on the latter during the wheel-applying or wheel-removing operations. The arm and platform are movable to present the wheel and its tire in a horizontal position underneath the vehicle body during normal travel. However, when the wheel and tire are to be removed, the arm and platform are arranged to be moved into a position alongside the vehicle to allow the wheel and tire to be withdrawn from the platform, or another wheel and tire assembly applied thereto.

It is proposed in the present invention to provide improved mounting means for securing the swivel arm to the chassis frame; and also improved structure for connecting the free end of the arm to the chassis frame.

A still further object of my invention is to provide a carrier that will mount either a wheel-tire assembly thereon, or a tire-rim assembly. I provide a platform that is adjustable so as to accommodate wheel-tire assemblies or tire-rim assemblies of various sizes.

Other objects and advantages will appear as the specification continues, and the novel features will be set forth in the claims hereunto annexed.

For a better understanding of my invention, reference should be had to the accompanying drawings, forming part of this application, in which:

Figure 1 is a side elevation of a semi-trailer showing my carrier applied thereto;

Figure 2 is a fragmentary perspective view disclosing the first step of removing a wheel-tire assembly from the carrier;

Figure 3 illustrates the swivel arm moved into a position to clear the assembly from the chassis body;

Figure 4 discloses the next step of removing the assembly from the carrier;

Figure 5 shows the final step of removing the assembly from the carrier, or the initial step in placing a wheel-tire assembly thereon;

Figure 6 is an enlarged side elevation of my carrier and showing fragmentary portions of the chassis frame;

Figures 7 and 8 are horizontal transverse sectional views taken along the lines VII—VII and VIII—VIII, respectively, of Figure 6;

Figure 9 is an end view taken along the line IX—IX of Figure 6 and showing a wheel-tire assembly in broken lines as being supported on the carrier;

Figure 10 is a horizontal sectional view taken along the line X—X of Figure 6; and Figure 11 is a view similar to Figure 9, but showing a tire-rim assembly applied to the carrier.

While I have shown only the preferred forms of my invention, it should be understood that various changes, or modifications, may be made without in the scope of the appended claims without departing from the spirit thereof.

Referring to the drawings in detail, I show a vehicle indicated generally at A, which may be a truck, trailer, semi-trailer or the like. It includes a chassis frame B for supporting the body C of the vehicle. The body projects laterally beyond the chassis frame in the usual manner, as suggested in Figure 5. The parts thus far described are conventional, and I do not desire to be limited in the particular type of vehicle to which my carrier is attached.

In the drawings, I show a swivel bracket D, which includes a channel-shaped cross-sectional portion as shown in Figure 8. The web of the channel is indicated at 1 and the flanges at 2. The channel flanges are fashioned with outwardly-turned feet 3, which are secured to the chassis frame B by rivets 4, or other suitable fastening means.

It will be noted from Figure 6 that the swivel bracket D is secured to the chassis frame in upright position, with its lower portion 5 projecting below the chassis frame. This arrangement exposes the groove 6 of the channel in the lower portion of the swivel bracket. A tubular bearing 7 is disposed in the exposed groove portion and has opposing lugs 8 thereon, which are welded, or otherwise secured, to the flanges 2 of the swivel bracket (see Figures 6 and 8).

I provide a substantially L-shaped swivel arm

E having its upright end 9 projecting upwardly through the bearing 7 into a position above the latter. A collar 10 is fastened to the upright end 9 above the tubular bearing by means of a bearing pin 11 and cotter keys 12. The collar 10 overlies and bears against the top of the bearing 7 to limit downward movement of the swivel arm.

Particular attention is called to the fact that the end 14 is mounted for swinging in a horizontal plane through 360° of movement. The bearing pin 11 and collar 10 may be removed through the exposed lower end of the channel groove 6 to permit a new swivel arm E to be substituted, without requiring removal of the swivel bracket D. Also, the latter may be riveted, or otherwise fastened, to the chassis frame B in a shop. At any time thereafter, the swivel arm E may be attached to the swivel bracket D by merely slipping the end 9 thereof upwardly in the tubular bearing 7 and anchoring the collar 10 in place.

The swivel bracket D may be attached to any suitable part of the vehicle, and the 360° of swinging will allow the arm to be extended or retracted. It will be observed that the horizontal end 14 of the swivel arm may be moved into parallel relation with respect to the chassis frame B, as shown in Figures 1 and 2, or swung into a position extending at right angles to the chassis frame, as in Figure 5.

The free end of the swivel arm carries a tiltable platform indicated generally at F. This platform includes a base plate 15, which is channel-shaped in transverse section. A pair of ears 16 are welded, or otherwise secured, to the web 15a of the base plate so as to extend therebelow in straddling relation with the free end of the swivel arm. Spacers 17 are fastened to the swivel arm and register with the ears 16. A horizontal pin 18 passes through the ears 16, spacers 17 and the end 14 of the swivel arm.

The construction just described permits the base plate 15 to be moved into a horizontal position overlying the swivel arm end 14 (see Figures 1 and 6), or swung to or toward an upright position (see Figure 5). It will be noted from Figure 6 that the ears 16 are mounted off-center relative to the base plate 15, and the reason therefor will be set forth as the specification continues.

A pair of substantially Z-shaped spacer plates G are adjustably connected to the web 15a of the base plate by bolts 19. These spacer plates may be moved toward or away from each other, since I provide a series of openings 20 (see Figure 10) through which the bolts 19 may be passed. Guide bars 21 are welded to opposite sides of each spacer plate G for movement therewith and to extend upwardly and outwardly relative to the base plate F. These guide bars reinforce the angular-arranged arms of the Z, as shown in Figures 9 and 11.

When a disc wheel H is applied to the tiltable platform F, the conical-shaped hub 22 of the wheel bears against the bars 21. The latter cause the wheel to shift into a central position with respect to the tiltable platform F. Each spacer plate G has an opening 23 therein through which a J-shaped hook J passes. The lower end of each hook is threaded as at 24, for receiving a nut 25 below its spacer plate. The over-turned upper ends 26 engage with a rim 27 of the disc wheel and clamp the latter against the spacer plates. The hub of the disc wheel is apertured at 28 to permit the J-hooks to pass therethrough (see Figures 4 and 9).

A channel-shaped lever plate K is welded, or otherwise secured, to the base plate 15, as at 29 (see Figures 9 and 11). This plate serves as a lever for swinging the tiltable platform F about its horizontal pin 18. When the plate K is disposed in upright position, as shown in Figures 1, 2, 3, 6 and 10, the platform F is horizontally arranged above the swivel arm E. Upon swinging the lever plate K toward a horizontal position for wheel-changing operations, as in Figures 4 and 5, the platform F is swung toward vertical position. The inclination of the platform F is limited by the base plate 15 striking against an inclined end 30 of the swivel arm E (see Figure 6).

The chassis frame B has an anchorage bracket M secured thereto. This bracket is substantially channel-shaped in cross-section and has feet 31 thereon, which are fastened to the chassis frame by rivets 32, or other fastening means. The bracket M is disposed in upright position and has studs 33 fixed to and projecting forwardly therefrom. The studs are designed to pass through openings 34 formed in the lever plate K, and nuts 33a are used for drawing the plate K and bracket M together.

I wish to point out that there is a distinct advantage of having the studs 33 fixed to the bracket M. When the driver moves the lever K toward the bracket M, it is a simple matter to move the openings 34 over the studs. It would be much more difficult to attempt to align openings in the lever K and bracket M and then insert bolts through the aligned openings.

When the lever plate K is brought up against the anchorage bracket M, the web 35 and flanges 36 of the former embrace and contact with the web 37 and flanges 38 of the latter, as clearly shown in Figure 7. The lever K projects through a central opening 39 in the disc wheel and supports the weight of the wheel H and its tire L when the lever is fastened to the anchorage bracket M. Also, the lever K prevents the swivel arm E from swinging when the lever is secured to the bracket M.

Having thus described the various parts of my carrier, the operation thereof may be summarized briefly as follows:

Assuming that a wheel-tire assembly H—L is arranged on the carrier in the manner shown in Figure 1, and the driver desires to utilize this assembly on one of the wheels of the vehicle A, the first step is to remove the nuts 33a by using a conventional standard socket or open-end type wrench 40. This step is shown in Figure 2. At this time, the swivel arm E is parallel to the chassis frame B and the wheel-tire assembly is disposed underneath the body C of the vehicle.

As the next step, the driver grasps the lever K and swings the wheel-tire assembly outwardly, the arm E turning in the bracket D. Now the tire is tipped to or toward a vertical position by merely pushing down on its outer edge, or by manually swinging the lever K. During this movement, the platform F rocks on its pivot pin 18 until the base plate 15 strikes the inclined end 30 of the arm E (see Figure 6). At this time the tire L will rest on the roadway 41, as disclosed in Figure 4, and the swivel arm E will extend at substantially right angles to the chassis frame, as in Figure 5.

Next, the driver unloosens the nuts 25 on the J-hooks and disengages the over-turned ends 26 of these hooks from the rim 27 of the wheel-tire assembly. The latter now is removed from the lever K, as in Figure 5, and rolled into position for being applied to the desired axle of the vehicle.

The reverse operation is followed when a wheel-tire assembly is to be placed on the carrier. As the assembly is placed against the spacer plates G, the conical-shaped hub 22 of the disc wheel will strike against the guide bars 21 so as to center the wheel relative to the base plate 15. The J-hooks may be engaged with the rim 27 at this time, or else the lever K may be moved manually in order to present the wheel-tire assembly in horizontal position and then the J-hooks applied.

The off-center mounting of the base plate 15 on the arm E materially facilitates the movement of the wheel-tire assembly from vertical to horizontal position. All that is required is to lift a few pounds and thereafter the weight of the tire and wheel lifts itself.

The construction and operation of the carrier illustrated in Figure 11 is identical with that just described. In this view, a rim N and tire O taken from an artillery or spoked wheel are shown as being mounted on my carrier and clamped thereto by the J-hooks. The same carrier will support a disc wheel-tire assembly or a rim-tire assembly. The spacer plates G may be adjusted for carrying wheels or rims of various diameters.

I claim:

1. In a tire carrier; a swivel bracket including a channel-shaped portion; means for securing the bracket to a chassis frame in upright position with part of the bracket projecting below the chassis frame; a bearing fastened to the bracket and disposed in a lower exposed part of the channel in spaced relation with said frame; a substantially L-shaped swivel arm having one end thereof projecting upwardly through the bearing into a position above the latter, and its other end arranged for swinging in a substantially horizontal plane; and a collar removably anchored to the upper end of the arm and riding on the top of the bearing to limit downward movement of the arm; the collar being insertable into the exposed channel or removable therefrom.

2. In a tire carrier; a swivel bracket including a channel-shaped portion; means for securing the bracket to a chassis frame in upright position with part of the bracket projecting below the chassis frame; a bearing fastened to the bracket and disposed in a lower exposed part of the channel in spaced relation with said frame; a substantially L-shaped swivel arm having one end thereof projecting upwardly through the bearing into a position above the latter, and its other end arranged below the chassis frame for swinging in a substantially horizontal plane through 360° of movement; and a collar removably anchored to the upper end of the arm and riding on the top of the bearing to limit downward movement of the arm; the collar being insertable into the exposed channel or removable therefrom.

3. In a tire carrier; a swivel bracket, including a channel-shaped cross-sectional portion; means for securing the bracket to a chassis frame in upright position, with part of the bracket projecting below the chassis frame; a tubular bearing sleeve disposed within the lower part of the channel and having lugs thereon anchored to the bracket; a substantially L-shaped swivel arm having one end thereof projecting upwardly through the bearing sleeve into a position above the latter, and its other end arranged for swinging in a substantially horizontal plane; a collar encircling the upper end of the arm and riding on the top of the bearing sleeve; and a removable pin for anchoring the collar to the arm to limit downward movement of the latter, the channel of the bracket giving access to the pin and collar for insertion or withdrawal of the pin and collar.

4. In a tire carrier; a swivel bracket; means for securing this bracket to a chassis frame in upright position; a substantially L-shaped swivel arm having one end thereof journalled in the swivel bracket, and its free end arranged for swinging in a substantially horizontal plane; means for limiting downward movement of the swivel arm relative to the swivel bracket; a platform arranged at the free end of the swivel arm for supporting a tire-wheel assembly or a tire-rim assembly; a channel-shaped plate extending from the platform for passing through either assembly; an anchorage bracket also secured to the chassis frame, and including a channel-shaped cross-sectional portion; the flanges and web of the channel-shaped plate being movable into a position to embrace and contact the flanges and web, respectively, of the anchorage bracket; and means for removably fastening the channel-shaped plate to the anchorage bracket.

5. In a tire carrier; a swivel bracket; means for securing the bracket to a chassis frame in upright position; a substantially L-shaped swivel arm having one end thereof journalled in the swivel bracket, and its free end arranged for swinging in a substantially horizontal plane; means for limiting downward movement of the swivel arm relative to the swivel bracket; a platform arranged at the free end of the swivel arm for supporting a tire-wheel assembly or a tire-rim assembly; a channel-shaped plate extending from the platform for passing through either assembly; an anchorage bracket also secured to the chassis frame, and including a channel-shaped cross-sectional portion; the flanges and web of the channel-shaped plate being movable into a position to embrace and contact the flanges and web, respectively, of the anchorage bracket; studs fixed to the anchorage bracket to extend therefrom, and project through openings in the plate when the latter abuts the anchorage bracket; and nuts made to be threaded on the ends of the studs projecting beyond the plate.

6. In a tire carrier; a swivel bracket; means for securing this bracket to a chassis frame in upright position; a substantially L-shaped swivel arm having one end thereof journalled in the swivel bracket, and its free end arranged for swinging in a substantially horizontal plane; means for limiting downward movement of the swivel arm relative to the swivel bracket; a platform having an off-center swinging connection with the free end of the swivel arm; the platform being arranged for supporting a tire-wheel assembly or a tire-rim assembly, and being swingable from a horizontal position overlying the swivel arm into an inclined position where the tire will rest on a roadway; a channel-shaped lever plate fixed to and extending from the platform for swinging the latter and arranged for passing through either assembly; an anchorage bracket also secured to the chassis frame, and including a channel-shaped cross-sectional portion; the flanges and web of the channel-shaped lever plate being movable into a position to embrace and contact the flanges and web, respectively, of the anchorage bracket; and means for removably fastening the channel-shaped lever plate to the anchorage bracket.

7. In a tire carrier; a swivel bracket; means for securing this bracket to a chassis frame in upright position; a substantially L-shaped swivel arm having one end thereof journalled in the swivel bracket, and its free end arranged for swinging in a substantially horizontal plane; means for limiting downward movement of the swivel arm relative to the swivel bracket; a platform having an off-center swinging connnection with the free end of the swivel arm; the platform being arranged for supporting a tire-wheel assembly or a tire-rim assembly, and being swingable from a horizontal position overlying the swivel arm into an inclined position where the tire will rest on a roadway; the free end of the swivel arm being inclined to strike against the platform when the latter reaches a predetermined inclination; a channel-shaped lever plate fixed to and extending from the platform for swinging the latter and arranged for passing through either assembly; an anchorage bracket also secured to the chassis frame, and including a channel-shaped cross-sectional portion; the flanges and web of the channel-shaped lever plate being movable into a position to embrace and contact the flanges and web, respectively, of the anchorage bracket; and means for removably fastening the channel-shaped lever plate to the anchorage bracket.

8. In a tire carrier; a swivel arm; means for securing one end of the arm to a chassis frame with the other end of the arm movable in a substantially horizontal plane; a platform having an off-center swinging connection with the free end of the arm, and being movable from a horizontal position overlying the arm into an inclined position; guides extending upwardly and outwardly relative to the platform to engage with a conical hub of a disc wheel as the latter is placed on the platform to shift the wheel into a central position relative to the platform.

9. In a tire carrier; a swivel arm; means for securing one end of the arm to a chassis frame with the other end of the arm movable in a substantially horizontal plane; a platform having an off-center swinging connection with the free end of the arm, and being movable from a horizontal position overlying the arm into an inclined position; guides extending upwardly and outwardly relative to the platform to engage with a conical hub of a disc wheel as the latter is placed on the platform to shift the wheel into a central position relative to the platform, and means on the platform for clamping the wheel to the platform.

10. In a tire carrier; a swivel arm; a platform having a swinging connection with the arm, and being movable on a horizontal axis from a position overlying the arm into an inclined position; spacer plates adjustably fastened to the platform and being movable toward and away from each other; the spacer plates being made for supporting a tire-disc wheel assembly; a plurality of J-shaped hooks adjustably connected to the spacer plates for clamping the assembly thereto; and guides extending upwardly and outwardly relative to the platform to engage with the disc wheel as the latter is placed on the spacer plates to shift the wheel into a central position relative to the platform.

11. In a tire carrier; a swivel arm; a platform supported by the arm; substantially Z-shaped spacer plates adjustably fastened to the platform and being movable toward and away from each other; the spacer plates being made for supporting a tire-disc wheel assembly; a J-shaped hook associated with each spacer plate and being adjustably connected thereto, and having a turned-over upper end for engaging with a rim of the wheel for clamping the latter to its spacer plate; and a guide fixed to a side of each spacer plate to reinforce the latter; the guides extending upwardly and outwardly relative to the platform to engage with the disc wheel as the latter is placed on the spacer plates to shift the wheel into a central position relative to the platform.

KENNETH C. CLARK.

REFERENCES CITED

The following references are of record in the file of this patent:

UNITED STATES PATENTS

| Number | Name | Date |
| --- | --- | --- |
| 1,550,447 | Neely | Aug. 18, 1925 |
| 2,378,911 | Clark | June 26, 1945 |
| 2,400,274 | Ullman | May 14, 1946 |

FOREIGN PATENTS

| Number | Country | Date |
| --- | --- | --- |
| 19,266 | Great Britain | 1906 |
| 749,561 | France | May 8, 1933 |